US011895090B2

(12) United States Patent
Thomson

(10) Patent No.: US 11,895,090 B2
(45) Date of Patent: Feb. 6, 2024

(54) PRIVACY PRESERVING MALICIOUS NETWORK ACTIVITY DETECTION AND MITIGATION

(71) Applicant: Avast Software s.r.o., Prague (CZ)

(72) Inventor: Allan Thomson, Pleasanton, CA (US)

(73) Assignee: Avast Software s.r.o., Prague (CZ)

( * ) Notice: Subject to any disclaimer, the term of this patent is extended or adjusted under 35 U.S.C. 154(b) by 314 days.

(21) Appl. No.: 17/508,414

(22) Filed: Oct. 22, 2021

(65) Prior Publication Data

US 2023/0131988 A1   Apr. 27, 2023

(51) Int. Cl.
*H04L 9/40* (2022.01)

(52) U.S. Cl.
CPC ........ *H04L 63/0272* (2013.01); *H04L 63/029* (2013.01); *H04L 63/0254* (2013.01); *H04L 63/0421* (2013.01); *H04L 63/1433* (2013.01)

(58) Field of Classification Search
None
See application file for complete search history.

(56) References Cited

U.S. PATENT DOCUMENTS

| | | | | |
|---|---|---|---|---|
| 8,949,459 | B1 * | 2/2015 | Scholl | H04L 45/04 709/239 |
| 10,097,566 | B1 * | 10/2018 | Radlein | H04L 63/14 |
| 10,609,046 | B2 * | 3/2020 | Ricafort | H04L 63/1416 |
| 10,764,313 | B1 | 9/2020 | Mushtaq | |
| 10,778,699 | B1 * | 9/2020 | Bradley | H04L 63/1441 |
| 11,552,971 | B1 * | 1/2023 | Karak | G06N 20/00 |
| 2005/0177717 | A1 * | 8/2005 | Grosse | H04L 63/1466 713/160 |
| 2007/0121596 | A1 * | 5/2007 | Kurapati | H04M 3/436 370/356 |

(Continued)

FOREIGN PATENT DOCUMENTS

| | | | |
|---|---|---|---|
| EP | 4178159 | 5/2023 | |
| WO | WO 2021003014 | 1/2021 | |
| WO | WO-2023273279 A1 * | 1/2023 | ......... H04L 63/0869 |

OTHER PUBLICATIONS

Behal, Sunny et al., "D-Face: An anomaly based distributed approach for early detection of DDoS attacks and flash events", Journal of Network and Computer Applications vol. 111, Jun. 1, 2018, pp. 49-63. (Year: 2018).*

(Continued)

*Primary Examiner* — Michael Pyzocha
(74) *Attorney, Agent, or Firm* — Dovas Law, P.C.

(57) ABSTRACT

A method includes accessing a first intelligence feed including a plurality of cybersecurity incidents. A second intelligence feed is generated including a plurality of technical indicators defined on one or more virtual private network internet point of presence ("VPN internet PoP") that connects a plurality of VPN tunnels to an internet. The first and second intelligence feeds are compared, a particular incident is determined, and a time frame of the particular incident is determined. Use of a particular VPN internet PoP by a plurality of sources including a plurality of clients is monitored to determine a plurality of time-based behaviors. The plurality of time-based behaviors are compared to the particular incident and to the time frame to determine a match. A particular source is blocked at the particular VPN internet PoP based on the determination of the match.

32 Claims, 9 Drawing Sheets

(56) References Cited

U.S. PATENT DOCUMENTS

| | | | |
|---|---|---|---|
| 2011/0088028 A1* | 4/2011 | Tofighbakhsh | H04L 63/1441 455/419 |
| 2014/0215612 A1* | 7/2014 | Niccolini | H04L 63/1425 726/22 |
| 2016/0099963 A1 | 4/2016 | Mahaffey et al. | |
| 2016/0182454 A1* | 6/2016 | Phonsa | H04L 63/0263 726/11 |
| 2017/0086092 A1* | 3/2017 | Kim | H04W 40/00 |
| 2019/0028502 A1* | 1/2019 | Bihannic | H04L 63/1441 |
| 2023/0055046 A1* | 2/2023 | Whited | H04L 47/122 |

OTHER PUBLICATIONS

Extended EU Search Report dated Apr. 6, 2023 for EP22202836.7-1218.

W. N. H. Ibrahim et al., "Multilayer Framework for Botnet Detection Using Machine Learning Algorithms," in IEEE Access, vol. 9, pp. 48753-48768, 2021, doi: 10.1109/ACCESS.2021.3060778.

* cited by examiner

PRIVACY PRESERVING MALICIOUS NETWORK ACTIVITY DETECTION AND MITIGATION

FIELD OF INVENTION

The invention relates generally to computing security, and more particularly to malicious network activity detection and mitigation.

BACKGROUND

Several computing services companies currently provide virtual private network ("VPN") services that enable a user to initiate a VPN tunnel to a selected location and connect to the internet from an end of the VPN tunnel ("VPN endpoint"). A VPN service may be used by a user to access content or an internet service that might be restricted based on the originating geographic region of the user. Further, VPN services are often used for the purpose of hiding a user's identity from an internet service, for legitimate or nefarious purposes, by obfuscating the source internet protocol ("IP") address of the user's computing system when connecting to the internet service. A VPN service may be used by a malicious actor to launch an attack from a VPN endpoint provided by the VPN service rather than launching the attack from the malicious actor's source. It is more difficult to identify a malicious actor source using VPN services to launch an attack.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A method is provided including accessing a first intelligence feed including a plurality of cybersecurity incidents, including one or both of threats or attacks, observed on one or more internet-connected computing systems and respective indications of from where the plurality of cybersecurity incidents originated. The method further includes generating a second intelligence feed including a plurality of technical indicators defined on one or more virtual private network internet points of presence ("VPN internet PoPs") that connect a plurality of VPN tunnels to an internet. The first intelligence feed is compared to the second intelligence feed. A particular incident of the plurality of cybersecurity incidents is determined based on the comparison of the first intelligence feed to the second intelligence feed. A time frame of the particular incident is determined based on one or both of the first intelligence feed or the second intelligence feed. Use of a particular VPN internet PoP by a plurality of sources including a plurality of clients is monitored to determine a plurality of time-based behaviors. The plurality of time-based behaviors are compared to the particular incident and to the time frame of the particular incident to determine a match of a particular behavior of the plurality of time-based behaviors from a particular source including a particular client of the plurality of sources to the particular incident. The particular source is blocked at the particular VPN internet PoP based on the determination of the match of the particular behavior from the particular source to the particular incident.

A non-transitory computer readable storage medium is provided having computer-executable instructions that when executed cause one or more processors to perform operations including accessing a first intelligence feed including a plurality of cybersecurity incidents, including one or both of threats or attacks, observed on one or more internet-connected computing systems and respective indications of from where the plurality of cybersecurity incidents originated. The operations further include generating a second intelligence feed including a plurality of technical indicators defined on one or more virtual private network internet point of presence ("VPN internet PoPs") that connect a plurality of VPN tunnels to an internet and comparing the first intelligence feed to the second intelligence feed. A particular incident of the plurality of cybersecurity incidents is determined based on the comparison of the first intelligence feed to the second intelligence feed. A time frame of the particular incident is determined based on one or both of the first intelligence feed or the second intelligence feed. Use of a particular VPN internet PoP by a plurality of sources including a plurality of clients is monitored to determine a plurality of time-based behaviors. The plurality of time-based behaviors are compared to the particular incident and to the time frame of the particular incident to determine a match of a particular behavior of the plurality of time-based behaviors from a particular source including a particular client of the plurality of sources to the particular incident. The particular source is blocked at the particular VPN internet PoP based on the determination of the match of the particular behavior from the particular source to the particular incident.

A network-enabled threat mitigation system is provided. The mitigation system includes a first computing system including at least a first processor and at least a first non-transitory computer readable storage medium having encoded thereon first instructions that when executed by the at least the first processor cause the first computing system to perform a first process. The first process includes enabling a first virtual private network internet point of presence ("VPN internet PoP") and connecting a plurality of VPN tunnels to an internet via the first VPN internet PoP. The first process further includes determining a plurality of technical indicators associated with the plurality of VPN tunnels and transmitting the plurality of technical indicators associated with the plurality of VPN tunnels.

The threat mitigation system also includes a second computing system including at least a second processor and at least a second non-transitory computer readable storage medium having encoded thereon second instructions that when executed by the at least the second processor cause the second computing system to perform a second process. The second process includes enabling a second virtual private network internet point of presence ("VPN internet PoP") and enabling use of the second VPN internet PoP by a plurality of sources including a plurality of clients.

The threat mitigation system further includes a third computing system in network communication with the first computing system and the second computing system, the third computing system including at least a third processor and at least a third non-transitory computer readable storage medium having encoded thereon third instructions that when executed by the at least the third processor cause the third computing system to perform a third process. The third process includes accessing a first intelligence feed including a plurality of cybersecurity incidents, including one or both of threats or attacks, observed on one or more internet-connected computing systems and respective indications of from where the plurality of cybersecurity incidents originated. The third process also includes receiving from the first computing system the plurality of technical indicators, generating a second intelligence feed including the plurality of technical indicators, and comparing the first intelligence feed to the second intelligence feed. The third process further includes determining a particular incident of the plurality of cybersecurity incidents based on the comparison of the first intelligence feed to the second intelligence feed and determining a time frame of the particular incident based on one or both of the first intelligence feed or the second intelligence feed. The third process further includes monitoring the use of the second VPN internet PoP by the plurality of sources including the plurality of clients to determine a plurality of time-based behaviors and comparing the plurality of time-based behaviors to the particular incident and to the time frame of the particular incident to determine a match of a particular behavior of the plurality of time-based behaviors from a particular source including a particular client of the plurality of sources to the particular incident. Moreover, the third process includes blocking the particular source at the second VPN internet PoP based on the determination of the match of the particular behavior from the particular source to the particular incident.

BRIEF DESCRIPTION OF THE DRAWING(S)

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein.

Figure 3:
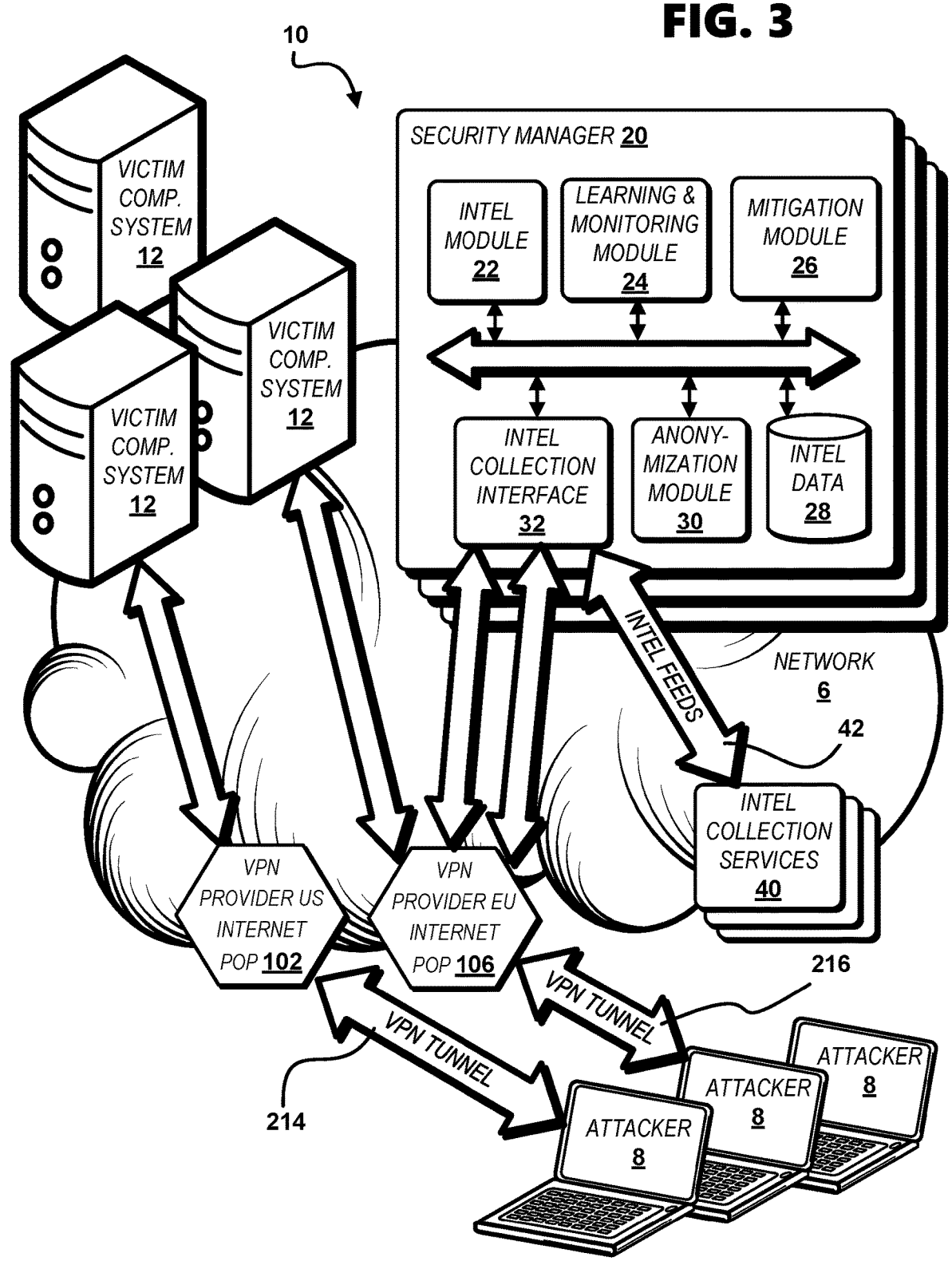
FIG. 3 is an environment in which VPN-enabled threats facing users of computing devices operating in a computer network are mitigated according to illustrative embodiments.
Figure 4:
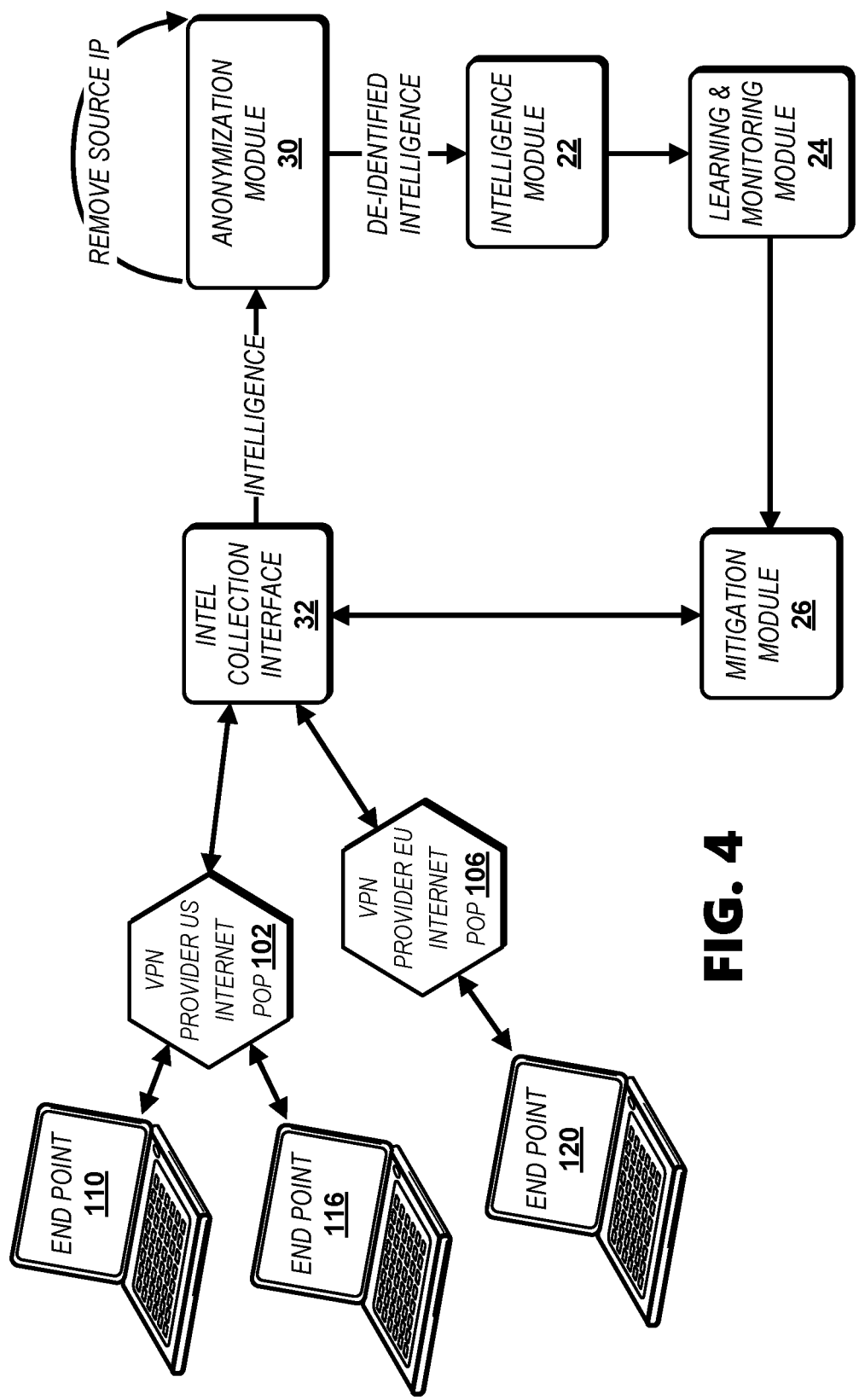
FIG. 4 is a diagram showing an information flow through components set forth in FIGS. 1-3 during a process for detecting and mitigating VPN-enabled threats.
Figure 5:
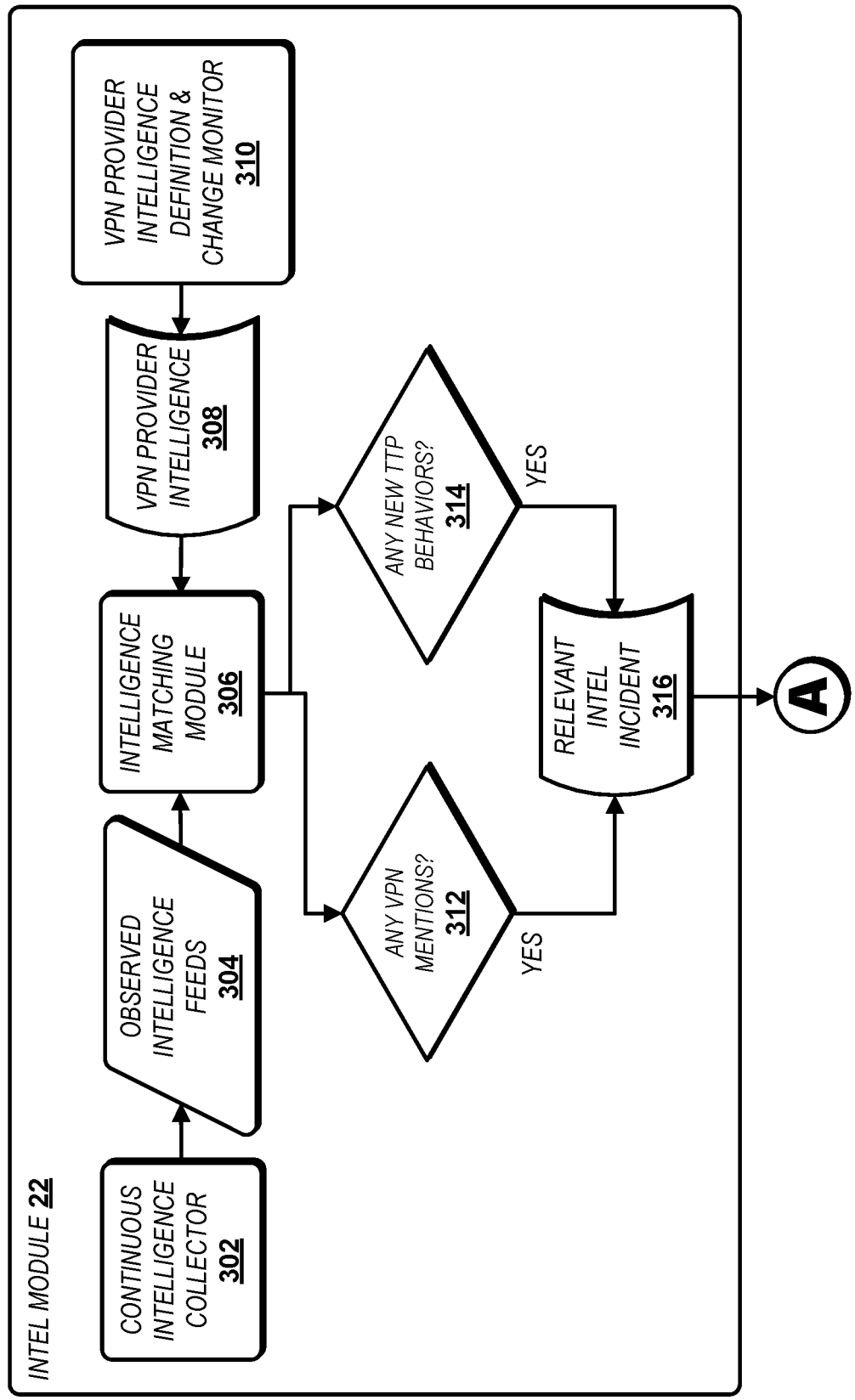
Figure 6:
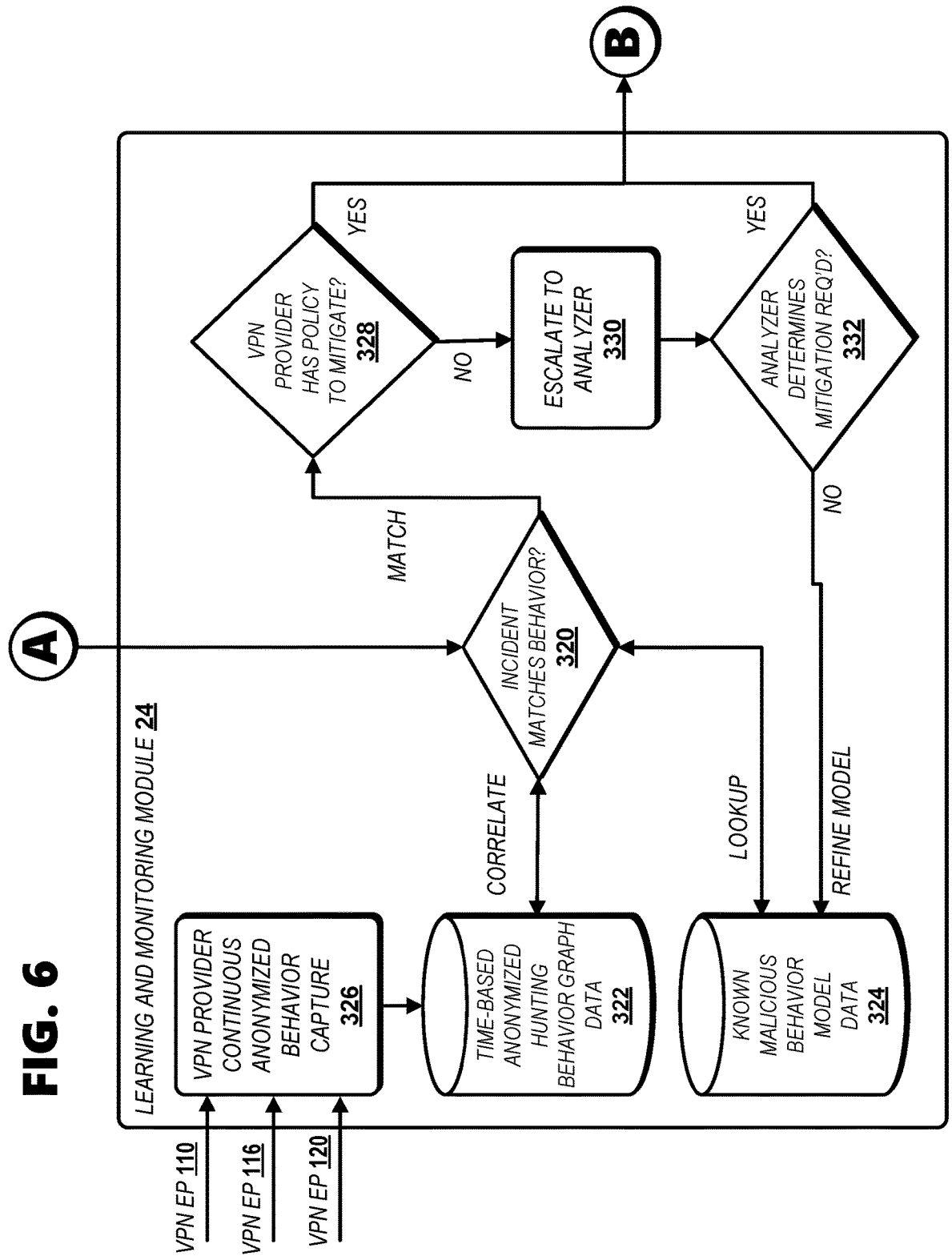
Figure 7:
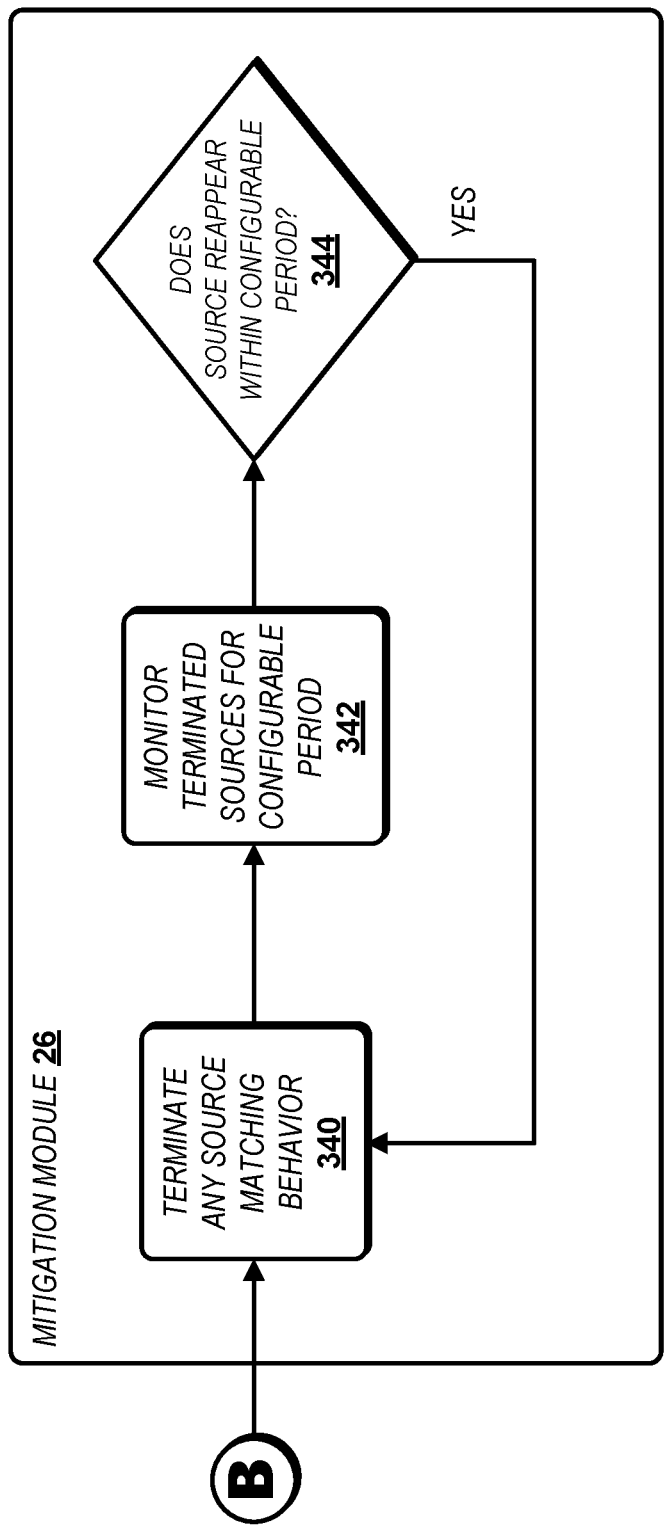

FIGS. 5-7 include process steps for detecting and mitigating VPN-enabled threats as performed by components set forth in FIGS. 3 and 4.

Figure 8:
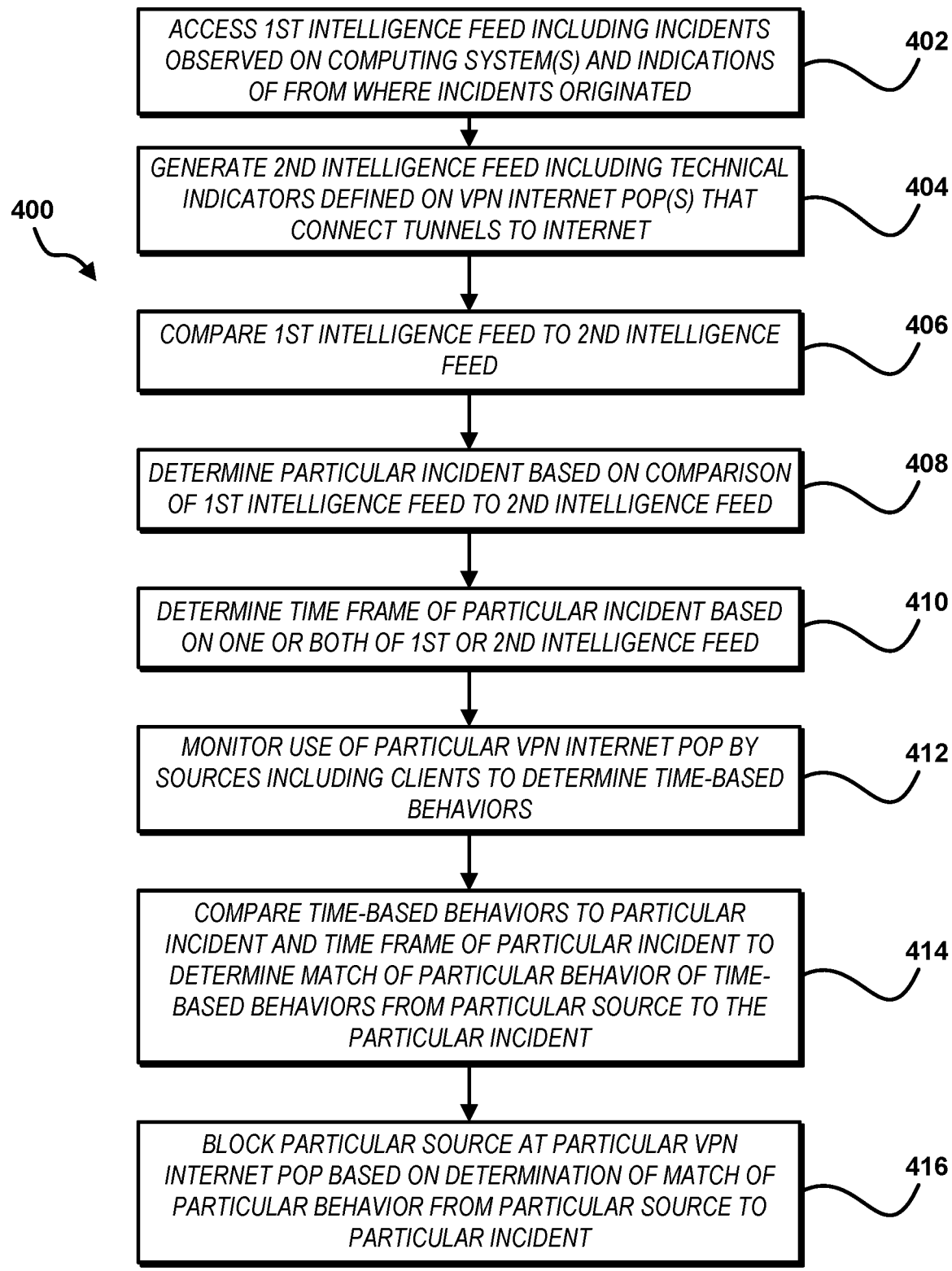

FIG. 8 is a diagram showing a method of detecting and mitigating a threat enabled via a virtual private network according to an illustrative embodiment.

Figure 9:
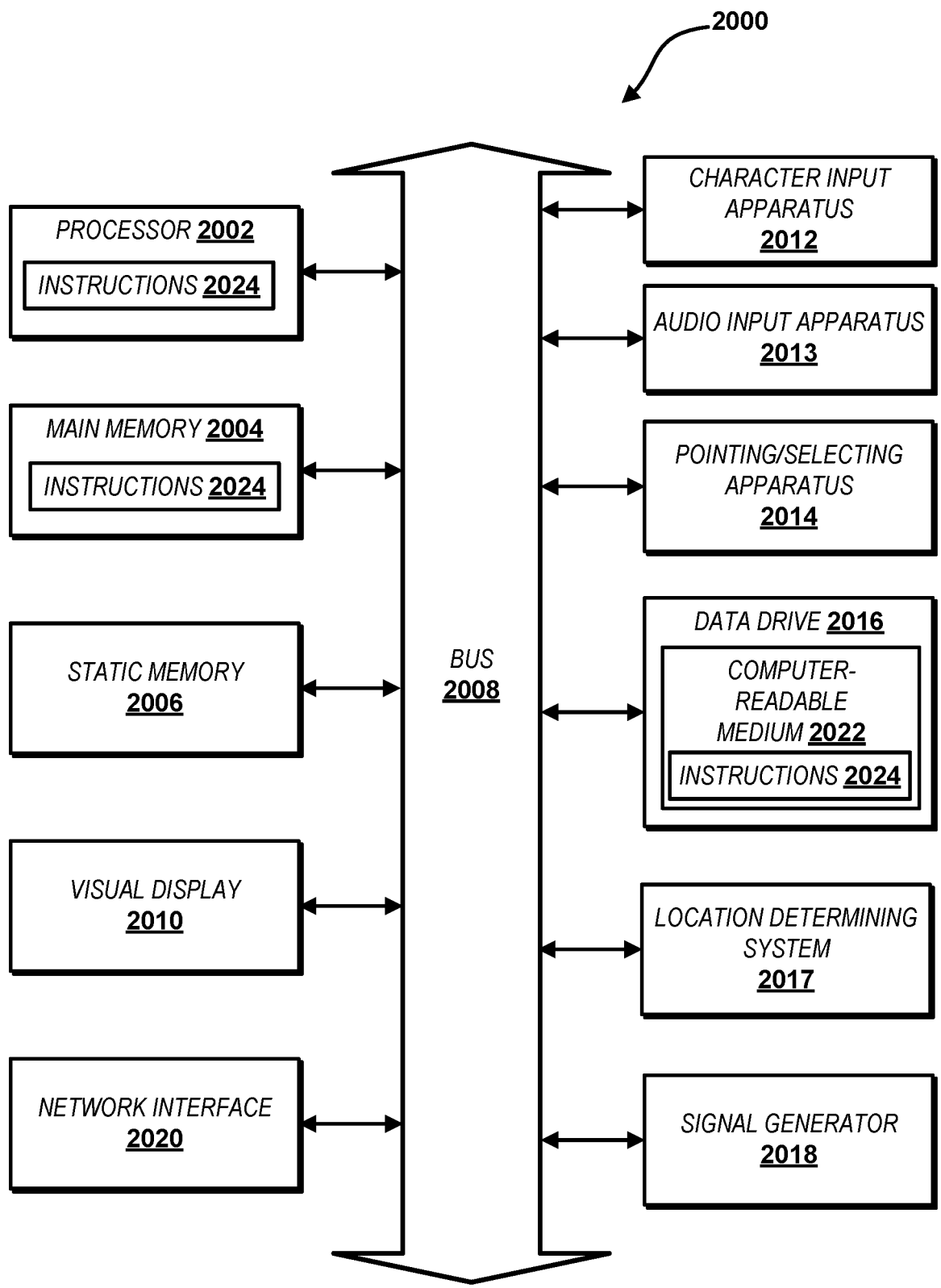

FIG. 9 shows a computer system for performing described methods according to illustrative embodiments.

DETAILED DESCRIPTION OF ILLUSTRATIVE EMBODIMENT(S)

Figure 1:
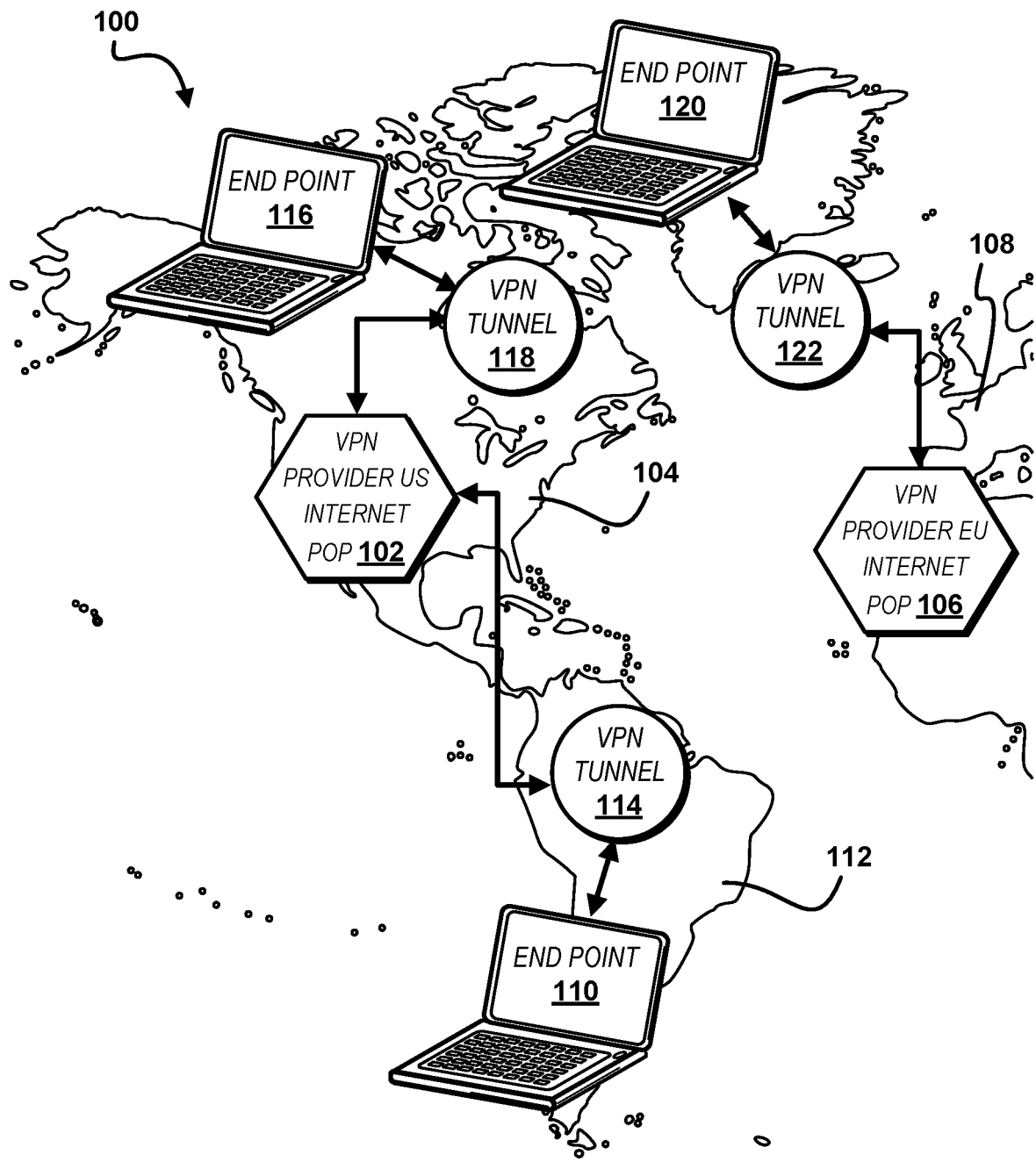
FIG. 1 is a diagram showing an exemplary first environment showing an exemplary network of a virtual private network ("VPN") provider overlaid on exemplary geographic locations.

Referring to FIG. 1, an exemplary first environment 100 including an exemplary network of a virtual private network ("VPN") provider is shown depicting exemplary geographic locations of various system entities. A United States internet point of presence ("US internet PoP") 102 is provided in North America 104 by the VPN provider, and a European internet point of presence ("EU internet PoP") 106 is provided in Europe 108 by the VPN provider. A first client including a first endpoint computing device ("endpoint") 110 in South America 112 connects via a first VPN tunnel 114 to VPN services at the US internet PoP 102 in North America 104. A second client including a second endpoint computing device ("endpoint") 116 in North America 104 connects via a second VPN tunnel 118 to VPN services at the US internet PoP 102 in North America. A third client including a third endpoint computing device ("endpoint") 120 in North America 104 connects via a third VPN tunnel 122 to VPN services at the EU internet PoP 106 in Europe 108.

Figure 2:
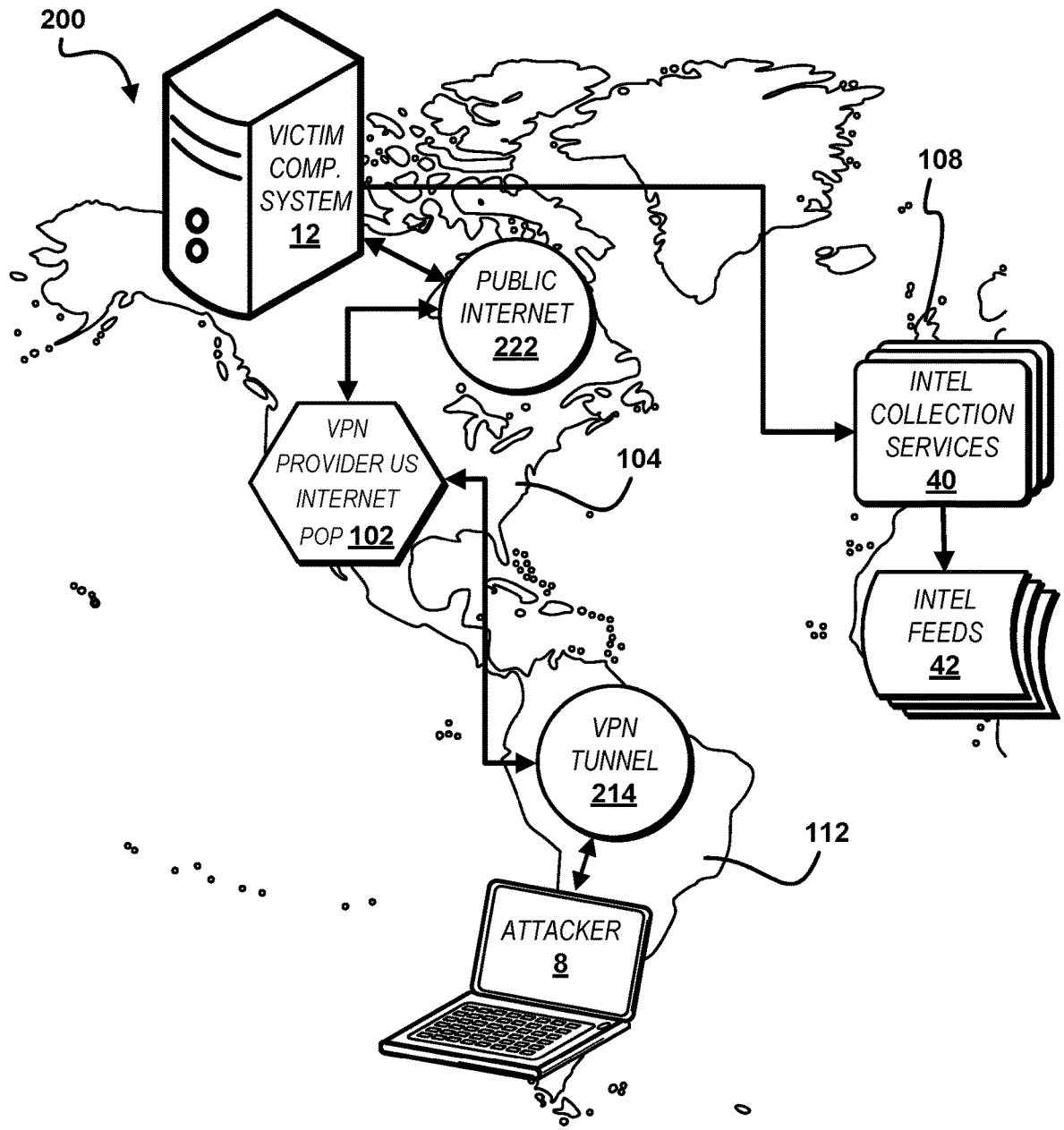
FIG. 2 is a diagram showing an exemplary second environment showing another exemplary network of a VPN provider overlaid on exemplary geographic locations.

A malicious actor such as a computer system attacker ("attacker") may use the VPN provider's network including internet PoPs 102, 106 to attack a victim to avoid detection of the attacker's activities and to hinder mitigation efforts based on a detection. Referring to FIG. 2, an exemplary second environment 200 is shown of another exemplary network of a VPN provider in which a human or virtual attacker operating a computer ("attacker computer") 8 is based in South America 112. The attacker computer 8 connects to the VPN provider's network at the US internet PoP 102 via a particular VPN tunnel 214 and then initiates an attack on a destination computing system 12 of a user based in North America 104 through the US internet PoP 102 via a public internet connection 222. The computing system 12 and the user or users of the computing system 12 become victims of malicious activities perpetrated by the attacker computer 8. The public internet protocol ("IP") address space used to initiate the attack against the victim includes a public IP address of the VPN provider's network at the US internet PoP 102. Therefore, the attack would appear to originate from the IP address space of the VPN provider's network at the US internet PoP 102 and not the public IP address of the attacker computer 8 in South America 112.

Referring to FIG. 3, an exemplary third environment 10 is shown including a network-connectable processor-enabled security manager 20 provided for detecting and mitigating VPN-enabled threats facing computing systems 12. The computing systems 12 operate in a computer network 6 including one or more wired or wireless networks or a combination thereof, for example including the VPN provider's network, a local area network (LAN), a wide area network (WAN), the internet, mobile telephone networks, and wireless data networks such as Wi-Fi™ and 3G/4G/5G cellular networks. Threats can originate from attacker computers 8 utilizing services of the VPN provider via the US internet PoP 102, EU internet PoP 106, or other internet PoPs operating from other geographic locations.

The security manager 20 coupled to the US internet PoP 102 and the EU internet PoP 106 enables threat detection and mitigation to be provided to the US internet PoP 102 and the EU internet PoP 106. Further, the security manager 20 can be connected to any number of internet PoPs to enable threat detection and mitigation for such internet PoPs. The security manager 20 provides threat information to the US internet PoP 102 and the EU internet PoP 106 16 via an intelligence collection interface 32 for enabling the respective internet PoP 102, 106 to filter and block attacker computers 8 from connecting via VPN tunnels 214, 216 to the internet PoPs 102, 106.

Further, the intelligence collection interface 32 monitors activity on the internet PoPs 102, 106 to generate threat intelligence data, which threat intelligence data is stored in an intelligence datastore 28. Threat intelligence data is used by an intelligence module 22, learning and monitoring module 24, and mitigation module 26 in detecting and analyzing threats for example computer viruses, spyware applications, or phishing actions. The security manager 20 further engages and monitors intelligence collection services 40 via the intelligence collection interface 32 for example by accessing third party websites, applications, or other services to gather threat intelligence data for example including but not limited to open-source block lists, automatically shared indicator lists (e.g., the Automated Indicator Sharing ["AIS"] Department of Homeland Security ["DHS"] shared lists), or network attack surface data (e.g., RiskIQ™ data).

Intelligence collection services 40 can be enabled for example by third party intelligence providers that provide threat intelligence data regarding attacks against computing systems 12 of victims, which threat intelligence data can include information describing attackers' infrastructures and observed tactics, techniques and procedures ("TTPs") associated with attacks. An attack infrastructure rendered available by an intelligence collection service 40 can include for example a VPN provider's public IP address space from which an attack originated as opposed to the attacker's true IP address which is likely not discernable by the intelligence collection service 40 if the attacker employs a VPN tunnel via a VPN service to conduct the attack. Since a VPN provider does not typically expose clients' personally identifiable information ("PII") including source IP addresses of clients, intelligence collection services 40 observing an attack at a computing system 12 of a victim cannot determine where the attack came from beyond the VPN provider's IP address space. The intelligence collection services 40 can enable an agent on the computing systems 12 with consent of an administrator of the computing systems 12 to facilitate collection of threat intelligence data by the intelligence collection services 40.

The security manager 20 monitors, detects, and mitigates network behaviors at a plurality of internet PoPs, for example including US internet PoP 102 and EU internet PoP 106, via an anonymization module 30, an intelligence module 22, a learning and monitoring module 24, and a mitigation module 26. Referring to FIG. 4, behaviors originating from endpoints in a VPN network of a VPN provider (e.g., endpoints 110, 116, 120) are aggregated by the intelligence collection interface 32 via internet PoPs 102, 106. The anonymization module 30 removes source IP addresses associated with the endpoints (e.g., endpoints 110, 116, 120) and anonymizes the aggregated behavior to generate de-identified intelligence which is forwarded to the intelligence module 22. The intelligence module 22 performs comparison operations based on the de-identified intelligence from the anonymization module 30 and intelligence from the intelligence collection services 40 to determine incidents which are used by a learning and monitoring module 24 to inform a mitigation module 26. The mitigation module 26 can inform internet PoPs 102, 106 via the intelligence collection interface 32 to detect malicious behaviors and block sources of detected malicious behaviors.

Referring to FIG. 5, The intelligence module 22 in a first aspect gathers intelligence feeds 42 via a continuous intelligence collector 302 from a variety of intelligence collection services 40 including for example RiskIQ™ brand services, open-source blocklists, and AIS DHS shared lists. The continuous intelligence collector 302 aggregates the intelligence feeds 42 from the intelligence collection services 40 into observed intelligence feeds 304. The observed intelligence feeds 304 beneficially include external observations by third-party security organizations that indicate a threat or malicious act has been observed. The observed intelligence feeds 304 further include timeframe information, for example timeframe information substantially identical or similar to STIX™ 2.1 indicator and sighting time properties (e.g., specifying "valid_from"/"valid_to" objects in a JavaSript™ object notation ["JSON"] implementation). Time frame information can indicate how messages and packets that enable different functions on the internet are sequenced and transmitted over a time period.

A second intelligence aspect is enabled by a VPN provider intelligence definition and change monitor 310 that collects VPN provider intelligence 308, for example gathered via the intelligence collection interface 32 from the internet PoPs 102, 106. The VPN provider intelligence 308 can include technical indicators, for example IP addresses, domain name system ("DNS") entries on network assignments, TTPs, host providers, and autonomous system numbers ("ASNs") defined by the VPN provider on the internet PoPs 102, 106 that connect the VPN provider's VPN tunnels to the internet in various locations. An intelligence matching module 306 continuously monitors the observed intelligence feeds 304 and the VPN provider intelligence 308. If the intelligence matching module 306 determines any intelligence from the observed intelligence feeds 304 that matches the VPN provider intelligence 308, then the intelligence matching module 306 causes an alert that a match has been found.

In a particular implementation, the intelligence matching module 306 performs behavioral matching based on observations of how multiple messages or packets that enable different operations on the internet are sequenced and transmitted over a time period. The intelligence matching module 306 is configured to determine sequences in time and time gaps between originating messages, packets, or combinations thereof for the purpose of performing matching operations. For example, it can be determined whether compared intelligence includes messages, packets, or combinations thereof in the same order in determining a match. In a further example it can be determined that a message 1 and a message 2 were gapped by 5 minutes in a message stream, whereas the message 2 and a message 3 were gapped by 60 minutes in the message stream, which information regarding the messages 1, 2, and 3 can be used in determining a match.

The intelligence matching module 306 can further perform behavioral matching based on how old a particular behavior is. For example, it can be determined whether a particular behavior was first observed last week, last month, six months ago, or twelve months ago. The older a particular behavior is, the less likely it is to match current malware or current attacks. More current behaviors are prioritized over older ones when the matching module 306 performs matching operations.

In another scenario, an attacker may subvert a DNS to indicate that a particular DNS resolution is from a particular VPN provider but in fact is not. In such manner, an attacker uses the VPN provider as vehicle to attack without actual use of VPN provider VPN resources. The matching module 306 is configured to look for DNS records that may match one or more names of a particular VPN provider but have bad or unknown IP address assignments for the DNS domains.

Observed intelligence feeds 304 and VPN provider intelligence 308 include artifacts including technical indicators of incidents but do not necessarily include identification of an originating source (e.g., IP address) connected to a VPN (e.g., via one of internet PoPs 102, 106). The intelligence matching module 306 compares the behaviors associated with an incident and determines relevance to a VPN providers' VPN (e.g., a protected VPN), but not relevance to the originating source that was connected to the VPN (e.g., endpoints 110, 116, 120) via an internet PoP (e.g., internet PoPs 102, 106). In this manner, privacy of VPN users is preserved, because signs of behavior on the VPN are compared without necessarily looking for a source IP of the behavior.

The match can include for example a determination of a VPN mention (step 312) in the observed intelligence feeds 304 originating from an internet PoP of the VPN provider as indicated in the VPN provider intelligence 308. Further, the match can include a determination of a new TTP behavior (step 314) in the observed intelligence feeds 304 originating from an internet PoP of the VPN provider as indicated in the VPN provider intelligence 308. An alert based on a match is generated in the form of a relevant intelligence incident 316 which is transmitted by the intelligence module 22 to the learning and monitoring module 24 as shown via indicator "A". This alert signifies that an observed relevant intelligence incident 316 either executed from or included some aspects of the VPN provider's infrastructure. The VPN provider is further enabled to act on the relevant intelligence incident.

Referring to FIG. 6, the learning and monitoring module 24 includes two manners in which an action is initiated. In a first initiation of action, an alert in the form of the relevant intelligence incident 316 is received from the intelligence module 22 at indicator "A". The learning and monitoring module 24 determines a time frame associated with an attack observed in the relevant intelligence incident 316 and looks up all associated TTPs and meta-data associated with the attack that was occurring during that time frame from a time-based anonymized hunting behavior graph datastore 322. The time-based anonymized hunting behavior graph datastore 322 beneficially does not include source internet protocol ("IP") information directly. An anonymized version of the source IP is used while capturing the behaviors (e.g., connections, protocols, ports, and flows) of a source (e.g., an attacker computer 8). This anonymization ensures that although the behaviors are captured, the behaviors are not attributed back to a particular client of the VPN service (i.e., a particular source) provided by the VPN provider.

The learning and monitoring module 24 looks for matches (step 320) of a relevant intelligence incident 316 with behavior in the time-based anonymized hunting behavior graph datastore 322. The learning and monitoring module 24 can perform matching operations in the manners described herein with reference to the intelligence matching module 306. For example, in performing matching operations between behaviors and relevant intelligence incidents 316, the learning and monitoring module 24 can determine sequences in time and time gaps between originating messages, packets, or combinations thereof and can determine when a behavior was first observed. The learning and monitoring module 24 can further account for the time windows of actual occurrences, matching behaviors and relevant intelligence incidents 316 based in part on whether they occur in the same time window.

In certain circumstances a malware campaign may target specific asset types on the internet, for example certain financial sites or certain news sites, at the same time or in a particular sequence. A relevant intelligent incident 316 can include a targeted asset of an attack which allows the learning and monitoring module 24 to not only look for behavior of the attack but also to categorize the target of the attack which is connected to by an attacking system. This permits discerning for example whether a behavior is associated with an attack on financial websites or an attack on news websites. Discerning a type of website (e.g., financial or news) or network service from a relevant intelligence incident 316 enables for example discerning a destination of the behavior, increasing a likelihood of generating a match in step 320 between observed behaviors and the relevant intelligence incident 316.

Either an exact match is found for a set of behaviors during the relevant time frame, if the relevant intelligence incident 316 includes sufficient TTP details, or the learning and monitoring module 24 uses the relevant intelligence incident 316 to train a machine learning model for identifying likely behaviors of malicious content that are captured in the known malicious behavior model datastore 324 of the VPN provider. If an exact match is found, information regarding the match is passed to a policy enforcement point ("PEP") at step 328 where it is determined if the VPN provider has a policy to mitigate the particular relevant intelligence incident 316. If the VPN provider has a policy to mitigate the particular relevant intelligence incident 316, the PEP at step 328 passes a mitigation action to the mitigation module 26, for example if a policy is defined by the VPN provider to block such incidents when the confidence/accuracy of the match is above a defined criterion. If the match does not meet the particular criteria defined by the PEP at step 328, an analyzer, beneficially an artificial intelligence analyzer, of the VPN provider is delivered the information regarding the match at step 330 including the relevant intelligence incident 316. The analyzer is further provided at step 330 with any intelligence passed as part of the relevant intelligence incident 316 as well as any likely behaviors from the time-based anonymized hunting behavior graph datastore 322 so that the analyzer can make an informed decision at step 332 on whether to mitigate or potentially update the known time-based anonymized hunting behavior graph datastore 322 with additional aspects of behavior which may provide a more accurate match in the future.

In a second initiation of action, the learning and monitoring module 24 of the VPN provider continuously monitors and captures active anonymized behaviors (step 326) originating from endpoints in a VPN network of the VPN provider (e.g., endpoints 110, 116, 120, and attacker computer 8) looking for likely matches to the set of malicious behavior models in the known malicious behavior model datastore 324. If a match occurs and there is a determination (step 320) that the model is sufficiently detailed and accurate to cause an automatic mitigation action (i.e., a block), the learning and monitoring module 24 can decide to mitigate in step 328. Alternatively, a decision can be made at step 328 to send an alert to an analyzer (e.g., an artificial intelligence analyzer or group of artificial intelligence analyzers) to investigate and refine the data collection to allow a more accurate determination on the behaviors based on the models stored in the known malicious behavior model datastore 324.

Referring to FIG. 7, if a mitigation action is passed onto the mitigation module 26 at an indicator "B" the following steps occur. In a case that the learning and monitoring module 24 passes a specific incident requiring immediate mitigation (e.g., immediate blocking action), at step 340 the mitigation module 26 terminates any behaviors and their associated anonymized sources (e.g., attacker computers 8) from connecting to the VPN provider's network (e.g., US internet PoP 102 and EU internet PoP 106). At a step 342, the mitigation module 26 monitors for subsequent attempts by the terminated source (e.g., attacker computer 8) to reconnect for a configurable "cool-off" period (e.g., 1 hour, 1 day, or 1 week), where the VPN provider refuses to accept new connections (e.g., at US internet PoP 102 and EU internet PoP 106) from that source until the cool-off period has expired. The mitigation module 26 does not persist any source IP address information beyond the cool-off period, and there is no PII of the source exposed or saved persistently beyond the cool-off period. Attacking systems (e.g., attacker computer 8) are blocked for a period of time from attacking regardless of what attack behavior they are attempting until the cool-off period has expired. It is determined at step 344 if the terminated source (e.g., attacker computer 8) reappears attempting to access the VPN provider network (e.g., US internet PoP 102 and EU internet PoP 106) during the cool-off period, in which case the process returns to step 340 when the configurable period expires and extends the cool-off period and continues monitoring the terminated sources during the extended cool-off period (step 342). The number of victims (e.g., computing systems 12) accessible by attackers via the VPN provider network are thereby reduced by the mitigation module 26.

As described herein, a system including the security manager 20 provides a VPN provider with a way to stop their infrastructure from being used for attacks based on two sources of information. A first source of information includes an intelligence provider (e.g., intelligence collection services 40), beneficially a third-party intelligence provider that has observed attacks and provided the behaviors and technical indicators that match the VPN provider's network infrastructure. A second source of information is provided through continuous monitoring of anonymized source behaviors throughout the VPN provider's VPN network, where the VPN provider is enabled to look for patterns of behavior that match known attacks and to terminate the source of the behavior.

The system including the security manager 20 is privacy preserving as the identity of original sources of VPN communications (e.g., endpoints 110, 116, 120 and attacker computer 8) are not required for behavioral matching of attacks. The system including the security manager 20 is able to improve over time where artificial intelligence can help improve the defined behaviors to look for that are malicious. So even if the intelligence providers (e.g., intelligence collection services 40) fail to provide sufficient detail on known malicious behavior, the VPN provider's analyst system (e.g., the security manager 20) can insert known malicious behaviors (e.g., from the known malicious behavior model datastore 324) that can then be matched against flow through the VPN provider's VPN network (e.g., flow through US internet PoP 102 and EU internet PoP 106).

VPN providers utilizing the security manager 20 increase their ability to police and protect their own VPN infrastructure from being used maliciously, increasing confidence in their services as secure VPN providers. Leveraging both internally and externally (e.g., third-party) gathered intelligence to confirm information on attacks permits the accuracy of behavioral detection to increase over time. Time-based behavior detection driven by intelligence improves the accuracy of the modeled behaviors associated with an attack, for example modeled behaviors stored in the known malicious behavior model datastore 324.

Referring to FIG. 8, a method 400 for detecting and mitigating a threat enabled via a virtual private network is shown. The method 400 is described with reference to the components in the first environment 100, the second environment 200, and the third environment 10. For example, the method 400 can be performed by the security manager 20 in communication with the internet PoPs 102, 106 and the intelligence collection services 40. Alternatively, the method 400 can be performed via other components in other environments and is not restricted to being implemented by the so described components.

In a step 402, a first intelligence feed is accessed including a plurality of cybersecurity incidents, including one or both of threats or attacks, observed on one or more internet-connected computing systems and including respective indications of from where the plurality of cybersecurity incidents originated. Accessing the first intelligence feed can include for example accessing one or more of a blocklist, an automated shared list, or network attack surface data. The plurality of cybersecurity incidents of the first intelligence feed can include one or more of computer viruses, spyware applications, or phishing actions. For example, the security manager 20 can access a first intelligence feed from the intelligence collection services 40 in the third environment 10 in accordance with step 402.

A second intelligence feed is generated including a plurality of technical indicators defined on one or more virtual private network internet points of presence ("VPN internet PoP" [singular] or "VPN internet PoPs" [plural]) that connects a plurality of VPN tunnels to an internet (step 404). The plurality of technical indicators can include for example one or more of internet protocol ("IP") addresses, host provider names, domain names, or autonomous system numbers ("ASNs"). For example, one or both of the security manager 20 or the internet PoPs 102, 106 can generate the second intelligence feed in the third environment 10 in accordance with step 404.

The first intelligence feed is compared to the second intelligence feed (step 406). As described herein, in comparing a first intelligence feed to a second intelligence feed, artifacts of the first intelligence feed are compared to artifacts of the second intelligence feed. For example, the comparison of the first intelligence feed to the second intelligence feed can include comparing the respective indications of from where the plurality of cybersecurity incidents originated to the plurality of technical indicators defined on the one or more VPN internet PoPs. In such manner, cybersecurity incidents can be matched to the one or more VPN internet PoPs. A particular incident of the plurality of cybersecurity incidents is determined based on the comparison of the first intelligence feed and the second intelligence feed (step 408).

The first intelligence feed can include a first IP address from which one or more of the plurality of cybersecurity incidents originated, and the second intelligence feed can include a second IP address from which the one or more VPN internet PoPs connects to the internet. The first IP address can be determined to match the second IP address based on the comparison of the first intelligence feed and the second intelligence feed, and the particular incident can be determined based on the determination that the first IP address matches the second IP address.

In an alternative implementation, the first intelligence feed can include one or more of a first tactic, a first technique, or a first procedure of one or more of the plurality of cybersecurity incidents, and the second intelligence feed can include one or more of a second tactic, a second technique, or a second procedure defined on the one or more VPN internet PoPs from one or more of the plurality of VPN tunnels. The one or more of the first tactic, the first technique, or the first procedure can be compared to the one or more of the second tactic, the second technique, or the second procedure, and the particular incident can be determined based on the comparison of the one or more of the first tactic, the first technique, or the first procedure to the one or more of the second tactic, the second technique, or the second procedure. For example, a match of the one or more of the first tactic, the first technique, or the first procedure to the one or more of the second tactic, the second technique, or the second procedure can be determined, and the particular incident can be determined based on the match of the one or more of the first tactic, the first technique, or the first procedure to the one or more of the second tactic, the second technique, or the second procedure.

The first intelligence feed includes artifacts beneficially including technical indicators of incidents, but does not include identification of an originating source (e.g., IP address of endpoints) connected to a VPN. The comparing of the first intelligence feed to the second intelligence feed can include comparing behaviors associated with the particular incident and determining relevance of the behaviors associated with the particular incident to traffic through the one or more VPN internet PoPs, without consideration of an originating source connected to the one or more VPN internet PoPs. In this manner, privacy of VPN users is preserved, because signs of behavior on a VPN can be compared without necessarily looking for an originating source (e.g., IP address of endpoints) of the behavior.

A time frame of the particular incident is determined based on one or both of the first intelligence feed or the second intelligence feed (step 410). The time frame of the particular incident can include one or more of a time of the particular incident, a duration of the particular incident, or a duration between actions of the particular incident.

Use of a particular VPN internet PoP by a plurality of sources including a plurality of clients (e.g., endpoints 110, 116, 120 and attacker computer 8) is monitored to determine a plurality of time-based behaviors (step 412). The one or more VPN internet PoPs can include the particular VPN internet PoP. In a particular implementation, the first intelligence feed can include a first IP address from which one or more of the plurality of cybersecurity incidents originated, and the second intelligence feed can include a second IP address from which the particular VPN internet PoP connects to the internet. The first IP address can be determined to match the second IP address based on the comparison of the first intelligence feed and the second intelligence feed, and the particular incident can be determined (in step 408) based on the determination that the first IP address matches the second IP address. Alternatively, the particular VPN internet PoP can be not included as one of the one or more VPN internet PoPs.

The plurality of time-based behaviors are compared to the particular incident and to the time frame of the particular incident to determine a match of a particular behavior of the plurality of time-based behaviors from a particular source including a particular client (e.g., a network-connected computing device) of the plurality of sources to the particular incident (step 414). The particular behavior can include accessing a website via the particular VPN internet PoP in a particular sequence of requests, responses, or requests and responses, and the requests, responses, or requests and responses can include content for rendering the website vulnerable to attack. The method can further include generating a plurality of anonymized source identifiers of the plurality of sources including the plurality of clients, and determining the match of the particular behavior of the plurality of time-based behaviors from the particular source of the plurality of sources to the particular incident can include matching a particular anonymized source identifier of the plurality of anonymized source identifiers to the particular incident.

The particular incident can include one or more of a first tactic, a first technique, a first procedure, or first metadata, and the plurality of time-based behaviors can include one or more of a second tactic, a second technique, a second procedure, or second metadata. A match of the one or more of the first tactic, the first technique, the first procedure, or the first metadata to the one or more of the second tactic, the second technique, the second procedure, or the second metadata can be determined based on the comparison of the plurality of time-based behaviors to the particular incident and to the time frame of the particular incident. The determination of the match of the particular behavior from the particular source to the particular incident can be based on the determination of the match of the one or more of the first tactic, the first technique, the first procedure, or the first metadata to the one or more of the second tactic, the second technique, the second procedure, or the second metadata.

The particular source is blocked at the particular VPN internet PoP based on the determination of the match of the particular behavior from the particular source to the particular incident (step 416). The blocking of the particular source can include disconnecting the particular source from communicating via a particular tunnel via the particular VPN internet PoP. Blocking the particular source can include blocking the particular behavior from the particular source including the particular client. In a case where the one or more VPN internet PoPs include a plurality of VPN internet PoPs, the method 400 can further include blocking the particular source at the plurality of VPN internet PoPs based on the determination of the match of the particular behavior from the particular source to the particular incident.

In an extension to the method 400, the particular source including the particular client can be blocked at the particular VPN internet PoP for a particular time period. An attempt by the particular source to use the particular VPN internet PoP during the particular time period can be detected, and the particular time period can be extended responsive to detecting the attempt by the particular source to use the particular VPN internet PoP during the particular time period. For example, a plurality of anonymized source identifiers of the plurality of sources including the plurality of clients can be generated, the particular source can be blocked at the particular VPN internet PoP for a particular time period, and an attempt by the particular source to use the particular VPN internet PoP during the particular time period can be detected via a particular anonymized source identifier of the plurality of anonymized source identifiers. Then the particular time period can be extended responsive to detecting via the particular anonymized source identifier the attempt by the particular source to use the particular VPN internet PoP during the particular time period.

In a case where the one or more VPN internet PoPs include a plurality of VPN internet PoPs, the method 400 can further include blocking for a particular time period the particular source at the plurality of VPN internet PoPs based on the determination of the match of the particular behavior from the particular source to the particular incident. An attempt by the particular source to use one or more of the plurality of VPN internet PoPs during the particular time period can be detected, and the particular time period can be extended responsive to detecting the attempt by the particular source to use the one or more of the plurality of VPN internet PoPs during the particular time period.

In another extension to the method 400, a particular geolocation attribution of the particular source can be determined to define a particular geographic area, and connections to the particular VPN internet PoP originating from the particular geographic area can be blocked. Alternatively, a timing attribution of the particular source can be determined to define a particular timing, and connections to the particular VPN internet PoP corresponding to the particular timing can be blocked. Further, a particular geolocation attribution of the particular source can be determined to define a particular geographic area, a timing attribution of the particular source can be determined to define a particular timing, and connections to the particular VPN internet PoP corresponding to the particular timing and originating from the particular geographic area can be blocked. The particular geolocation attribution can include an external IP address or other locator corresponding to a geographic area (e.g., a country, state, or city). The timing attribution can include one or more times in which a particular attack originated from a source (e.g., 1:00 am, 2:00 am, 4:00 am GMT), and the particular timing can include a particular range bounding the one or more times (e.g., a time range between 12:00 am and 5:00 am GMT). The timing attribution can further reference an attack duration, for example a particular source can be determined to have initiated attacks starting at 12:00 am GMT for a duration of two hours until 2:00 am GMT for a plurality of days over a particular period (e.g., a week, a month). Attacks for example may be executed by an actor during normal office hours (e.g., within certain hours of the day) from where an attacker lives. Attack time of day and location can be used to detect matches.

In another extension to the method 400, a classifier can be trained based on the plurality of time-based behaviors, the particular incident and the time frame of the particular incident. Use of the particular VPN internet PoP by additional sources including additional clients can be monitored to determine additional time-based behaviors. The classifier can be applied to the additional time-based behaviors to flag a certain behavior of the additional time-based behaviors from a certain source, and one or both of terminating the certain behavior at the particular VPN internet PoP or blocking the certain source at the particular VPN internet PoP can be performed based on the flagging of the certain behavior. Further, a plurality of anonymized source identifiers of the plurality of sources including the plurality of clients can be generated, wherein determining the match of the particular behavior of the plurality of time-based behaviors from the particular source of the plurality of sources to the particular incident comprises matching a particular anonymized source identifier to the particular incident. Additional anonymized source identifiers of the additional sources including the additional clients can be generated. A certain anonymized source identifier of the certain source is flagged based on the flagging the certain behavior; and the certain source is blocked based on the flagging of the certain anonymized source identifier.

The one or more VPN internet PoPs can include a plurality of VPN internet PoPs including the particular VPN internet PoP, the particular source can be blocked at the plurality of VPN internet PoPs based on the determination of the match of the particular behavior from the particular source to the particular incident. In an example implementation, the plurality of VPN internet PoPs can be operated by a single entity representing a VPN internet provider.

In a further extension to the method 400, certain incidents of the plurality of cybersecurity incidents are determined based on the comparison of the first intelligence feed and the second intelligence feed. Respective time frames of the certain incidents are determined based on the one or both of the first intelligence feed or the second intelligence feed. Use of certain VPN internet PoPs by the plurality of sources including the plurality of clients is monitored to further determine the plurality of time-based behaviors. The plurality of time-based behaviors are compared to the certain incidents and to the respective time frames of the certain incidents to determine a match of certain behaviors of the plurality of time-based behaviors from certain sources of the plurality of sources to the certain incidents respectively. The certain sources are blocked at the certain VPN internet PoPs based on the determination of the matches of the certain behaviors from the certain sources to the certain incidents respectively, and indications of the certain behaviors and the certain VPN internet PoPs and the blocking of the certain sources at the certain VPN internet PoPs are provided. The indications of the certain behaviors and the certain VPN internet PoPs and the blocking of the certain sources at the certain VPN internet PoPs can be provided as a display in a user interface.

FIG. 9 illustrates in abstract the function of an exemplary computer system 2000 on which the systems, methods and processes described herein can execute. For example, the computing systems 12, the security manager 20, and the internet PoPs 102, 106 can each be embodied by a particular computer system 2000 or a plurality of computer systems 2000. The computer system 2000 may be provided in the form of a personal computer, laptop, handheld mobile communication device, mainframe, distributed computing system, or other suitable configuration. Illustrative subject matter is in some instances described herein as computer-executable instructions, for example in the form of program modules, which program modules can include programs, routines, objects, data structures, components, or architecture configured to perform particular tasks or implement particular abstract data types. The computer-executable instructions are represented for example by instructions 2024 executable by the computer system 2000.

The computer system 2000 can operate as a standalone device or can be connected (e.g., networked) to other machines. In a networked deployment, the computer system 2000 may operate in the capacity of a server or a client machine in server-client network environment, or as a peer machine in a peer-to-peer (or distributed) network environment. The computer system 2000 can also be considered to include a collection of machines that individually or jointly execute a set (or multiple sets) of instructions to perform one or more of the methodologies described herein, for example in a cloud computing environment.

It would be understood by those skilled in the art that other computer systems including but not limited to networkable personal computers, minicomputers, mainframe computers, handheld mobile communication devices, multiprocessor systems, microprocessor-based or programmable electronics, and smart phones could be used to enable the systems, methods and processes described herein. Such computer systems can moreover be configured as distributed computer environments where program modules are enabled and tasks are performed by processing devices linked through a computer network, and in which program modules can be located in both local and remote memory storage devices.

The exemplary computer system 2000 includes a processor 2002, for example a central processing unit (CPU) or a graphics processing unit (GPU), a main memory 2004, and a static memory 2006 in communication via a bus 2008. A visual display 2010 for example a liquid crystal display (LCD), light emitting diode (LED) display or a cathode ray tube (CRT) is provided for displaying data to a user of the computer system 2000. The visual display 2010 can be enabled to receive data input from a user for example via a resistive or capacitive touch screen. A character input apparatus 2012 can be provided for example in the form of a physical keyboard, or alternatively, a program module which enables a user-interactive simulated keyboard on the visual display 2010 and actuatable for example using a resistive or capacitive touchscreen. An audio input apparatus 2013, for example a microphone, enables audible language input which can be converted to textual input by the processor 2002 via the instructions 2024. A pointing/selecting apparatus 2014 can be provided, for example in the form of a computer mouse or enabled via a resistive or capacitive touch screen in the visual display 2010. A data drive 2016, a signal generator 2018 such as an audio speaker, and a network interface 2020 can also be provided. A location determining system 2017 is also provided which can include for example a GPS receiver and supporting hardware.

The instructions 2024 and data structures embodying or used by the herein-described systems, methods, and processes, for example software instructions, are stored on a computer-readable medium 2022 and are accessible via the data drive 2016. Further, the instructions 2024 can completely or partially reside for a particular time period in the main memory 2004 or within the processor 2002 when the instructions 2024 are executed. The main memory 2004 and the processor 2002 are also as such considered computer-readable media.

While the computer-readable medium 2022 is shown as a single medium, the computer-readable medium 2022 can be considered to include a single medium or multiple media, for example in a centralized or distributed database, or associated caches and servers, that store the instructions 2024. The computer-readable medium 2022 can be considered to include any tangible medium that can store, encode, or carry instructions for execution by a machine and that cause the machine to perform any one or more of the methodologies described herein, or that can store, encode, or carry data structures used by or associated with such instructions. Further, the term "computer-readable storage medium" can be considered to include, but is not limited to, solid-state memories and optical and magnetic media that can store information in a non-transitory manner. Computer-readable media can for example include non-volatile memory such as semiconductor memory devices (e.g., magnetic disks such as internal hard disks and removable disks, magneto-optical disks, CD-ROM and DVD-ROM disks, Erasable Programmable Read-Only Memory (EPROM), Electrically Erasable Programmable Read-Only Memory (EEPROM), and flash memory devices).

The instructions 2024 can be transmitted or received over a computer network, for example the computer network 6, using a signal transmission medium via the network interface 2020 operating under one or more known transfer protocols, for example FTP, HTTP, or HTTPs. Examples of computer networks include a local area network (LAN), a wide area network (WAN), the internet, mobile telephone networks, Plain Old Telephone (POTS) networks, and wireless data networks, for example Wi-Fi™ and 3G/4G/5G cellular networks. The term "computer-readable signal medium" can be considered to include any transitory intangible medium that is capable of storing, encoding, or carrying instructions for execution by a machine, and includes digital or analog communications signals or other intangible medium to facilitate communication of such instructions.

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor.

While embodiments have been described in detail above, these embodiments are non-limiting and should be considered as merely exemplary. Modifications and extensions may be developed, and all such modifications are deemed to be within the scope defined by the appended claims.

What is claimed is:

1. A method comprising:
   accessing a first intelligence feed comprising a plurality of cybersecurity incidents, including at least one of threats or attacks, observed on at least one internet-connected computing system and respective indications of from where the plurality of cybersecurity incidents originated;
   generating a second intelligence feed comprising a plurality of technical indicators defined on at least one virtual private network internet point of presence ("VPN internet PoP") that connects a plurality of VPN tunnels to an internet;
   comparing the first intelligence feed to the second intelligence feed;
   determining a particular incident of the plurality of cybersecurity incidents based on the comparison of the first intelligence feed to the second intelligence feed;
   determining a time frame of the particular incident based on at least one of the first intelligence feed or the second intelligence feed;
   monitoring use of a particular VPN internet PoP by a plurality of sources comprising a plurality of clients to determine a plurality of time-based behaviors;
   comparing the plurality of time-based behaviors to the particular incident and to the time frame of the particular incident to determine a match of a particular behavior of the plurality of time-based behaviors from a particular source comprising a particular client of the plurality of sources to the particular incident; and
   blocking the particular source at the particular VPN internet PoP based on the determination of the match of the particular behavior from the particular source to the particular incident.

2. The method of claim 1, wherein the blocking of the particular source comprises disconnecting the particular source from communicating via a particular tunnel via the particular VPN internet PoP.

3. The method of claim 1, wherein blocking the particular source comprises blocking the particular behavior from the particular source comprising the particular client.

4. The method of claim 1, wherein the particular behavior comprises accessing a website via the particular VPN internet PoP in a particular sequence of at least one of requests or responses.

5. The method of claim 4, wherein the at least one of the requests or the responses comprise content for rendering the website vulnerable to attack.

6. The method of claim 1, further comprising generating a plurality of anonymized source identifiers of the plurality of sources comprising the plurality of clients, wherein determining the match of the particular behavior of the plurality of time-based behaviors from the particular source of the plurality of sources to the particular incident comprises matching a particular anonymized source identifier of the plurality of anonymized source identifiers to the particular incident.

7. The method of claim 1, wherein the at least one VPN internet PoP comprises a plurality of VPN internet PoPs, the method further comprising blocking the particular source at the plurality of VPN internet PoPs based on the determination of the match of the particular behavior from the particular source to the particular incident.

8. The method of claim 1, further comprising:
blocking the particular source at the particular VPN internet PoP for a particular time period;
detecting an attempt by the particular source to use the particular VPN internet PoP during the particular time period; and
extending the particular time period responsive to detecting the attempt by the particular source to use the particular VPN internet PoP during the particular time period.

9. The method of claim 1, further comprising:
generating a plurality of anonymized source identifiers of the plurality of sources comprising the plurality of clients;
blocking the particular source at the particular VPN internet PoP for a particular time period;
detecting via a particular anonymized source identifier of the plurality of anonymized source identifiers an attempt by the particular source to use the particular VPN internet PoP during the particular time period; and
extending the particular time period responsive to detecting via the particular anonymized source identifier the attempt by the particular source to use the particular VPN internet PoP during the particular time period.

10. The method of claim 1, wherein the at least one VPN internet PoP comprises a plurality of VPN internet PoPs, the method further comprising:
blocking for a particular time period the particular source at the plurality of VPN internet PoPs based on the determination of the match of the particular behavior from the particular source to the particular incident;
detecting an attempt by the particular source to use at least one of the plurality of VPN internet PoPs during the particular time period; and
extending the particular time period responsive to detecting the attempt by the particular source to use the at least one of the plurality of VPN internet PoPs during the particular time period.

11. The method of claim 10, further comprising:
determining a particular geolocation attribution of the particular source to define a particular geographic area; and
blocking connections to the particular VPN internet PoP originating from the particular geographic area.

12. The method of claim 10, further comprising:
determining a timing attribution of the particular source to define a particular timing; and
blocking connections to the particular VPN internet PoP corresponding to the particular timing.

13. The method of claim 10, further comprising:
determining a particular geolocation attribution of the particular source to define a particular geographic area;
determining a timing attribution of the particular source to define a particular timing; and
blocking connections to the particular VPN internet PoP corresponding to the particular timing and originating from the particular geographic area.

14. The method of claim 1, wherein accessing the first intelligence feed comprises accessing at least one of a blocklist, an automated shared list, or network attack surface data.

15. The method of claim 1, wherein the plurality of technical indicators comprise at least one of Internet Protocol ("IP") addresses, host provider names, domain names, or autonomous system numbers ("ASNs").

16. The method of claim 1, wherein:
the first intelligence feed comprises a first IP address from which at least one of the plurality of cybersecurity incidents originated; and
the second intelligence feed comprises a second IP address from which the at least one VPN internet PoP connects to the internet; the method further comprising:
determining the first IP address matches the second IP address based on the comparison of the first intelligence feed and the second intelligence feed; and
determining the particular incident based on the determination that the first IP address matches the second IP address.

17. The method of claim 1, wherein:
the first intelligence feed comprises a first IP address from which at least one of the plurality of cybersecurity incidents originated; and
the second intelligence feed comprises a second IP address from which the particular VPN internet PoP connects to the internet; the method further comprising:
determining the first IP address matches the second IP address based on the comparison of the first intelligence feed and the second intelligence feed; and
determining the particular incident based on the determination that the first IP address matches the second IP address.

18. The method of claim 1, wherein:
the first intelligence feed comprises at least one of a first tactic, a first technique, or a first procedure of at least one of the plurality of cybersecurity incidents;
the second intelligence feed comprises at least one of a second tactic, a second technique, or a second procedure defined on the at least one VPN internet PoP from at least one of the plurality of VPN tunnels; the method further comprising:
comparing the at least one of the first tactic, the first technique, or the first procedure to the at least one of the second tactic, the second technique, or the second procedure; and
determining the particular incident based on the comparison of the at least one of the first tactic, the first technique or the first procedure to the at least one of the second tactic, the second technique, or the second procedure.

19. The method of claim 18, further comprising:
determining a match of the at least one of the first tactic, the first technique, or the first procedure to the at least one of the second tactic, the second technique, or the second procedure; and
determining the particular incident based on the match of the at least one of the first tactic, the first technique, or the first procedure to the at least one of the second tactic, the second technique, or the second procedure.

20. The method of claim 1, wherein:
the particular incident comprises at least one of a first tactic, a first technique, a first procedure, or first metadata;
the plurality of time-based behaviors comprise at least one of a second tactic, a second technique, a second procedure, or second metadata;
determining a match of the at least one of the first tactic, the first technique, the first procedure, or the first metadata to the at least one of the second tactic, the second technique, the second procedure, or the second metadata based on the comparison of the plurality of time-based behaviors to the particular incident and to the time frame of the particular incident; and the determination of the match of the particular behavior from the particular source to the particular incident is based on the determination of the match of the at least one of the first tactic, the first technique, the first procedure, or the first metadata to the at least one of the second tactic, the second technique, the second procedure, or the second metadata.

21. The method of claim 1, further comprising:
training a classifier based on the plurality of time-based behaviors, the particular incident and the time frame of the particular incident;
monitoring use of the particular VPN internet PoP by additional sources comprising additional clients to determine additional time-based behaviors; and
applying the classifier to the additional time-based behaviors to flag a certain behavior of the additional time-based behaviors from a certain source; and
at least one of terminating the certain behavior at the particular VPN internet PoP or blocking the certain source at the particular VPN internet PoP based on the flagging of the certain behavior.

22. The method of claim 21, further comprising:
generating a plurality of anonymized source identifiers of the plurality of sources comprising the plurality of clients, wherein determining the match of the particular behavior of the plurality of time-based behaviors from the particular source of the plurality of sources to the particular incident comprises matching a particular anonymized source identifier to the particular incident;
generating additional anonymized source identifiers of the additional sources comprising the additional clients;
flagging a certain anonymized source identifier of the certain source based on the flagging the certain behavior; and
blocking the certain source based on the flagging of the certain anonymized source identifier.

23. The method of claim 1, wherein the plurality of cybersecurity incidents of the first intelligence feed comprise at least one of computer viruses, spyware applications, or phishing actions.

24. The method of claim 1, wherein the time frame of the particular incident comprises at least one of a time of the particular incident, a duration of the particular incident, or a duration between actions of the particular incident.

25. The method of claim 1, wherein the at least one VPN internet PoP comprises the particular VPN internet PoP.

26. The method of claim 1, wherein the at least one VPN internet PoP comprises a plurality of VPN internet PoPs comprising the particular VPN internet PoP, the method further comprising blocking the particular source at the plurality of VPN internet PoPs based on the determination of the match of the particular behavior from the particular source to the particular incident.

27. The method of claim 26, wherein the plurality of VPN internet PoPs are operated by a single entity representing a VPN internet provider.

28. The method of claim 1, further comprising:
determining certain incidents of the plurality of cybersecurity incidents based on the comparison of the first intelligence feed and the second intelligence feed;
determining respective time frames of the certain incidents based on the at least one of the first intelligence feed or the second intelligence feed;
monitoring use of certain VPN internet PoPs by the plurality of sources comprising the plurality of clients to further determine the plurality of time-based behaviors;
comparing the plurality of time-based behaviors to the certain incidents and to the respective time frames of the certain incidents to determine matches of certain behaviors of the plurality of time-based behaviors from certain sources of the plurality of sources to the certain incidents respectively;
blocking the certain sources at the certain VPN internet PoPs based on the determination of the matches of the certain behaviors from the certain sources to the certain incidents respectively; and
providing indications of the certain behaviors and the certain VPN internet PoPs and the blocking of the certain sources at the certain VPN internet PoPs.

29. The method of claim 28, further comprising providing the indications of the certain behaviors and the certain VPN internet PoPs and the blocking of the certain sources at the certain VPN internet PoPs as a display in a user interface.

30. The method of claim 1, wherein the comparison of the first intelligence feed to the second intelligence feed comprises comparing the respective indications of from where the plurality of cybersecurity incidents originated to the plurality of technical indicators defined on the at least one VPN internet PoP.

31. A non-transitory computer readable storage medium having computer-executable instructions that when executed cause one or more processors to perform operations comprising:
accessing a first intelligence feed comprising a plurality of cybersecurity incidents, including at least one of threats or attacks, observed on at least one internet-connected computing system and respective indications of from where the plurality of cybersecurity incidents originated;
generating a second intelligence feed comprising a plurality of technical indicators defined on at least one virtual private network internet point of presence ("VPN internet PoP") that connects a plurality of VPN tunnels to an internet;
comparing the first intelligence feed to the second intelligence feed;
determining a particular incident of the plurality of cybersecurity incidents based on the comparison of the first intelligence feed and the second intelligence feed;
determining a time frame of the particular incident based on at least one of the first intelligence feed or the second intelligence feed;
monitoring use of a particular VPN internet PoP by a plurality of sources comprising a plurality of clients to determine a plurality of time-based behaviors;
comparing the plurality of time-based behaviors to the particular incident and to the time frame of the particular incident to determine a match of a particular behavior of the plurality of time-based behaviors from a particular source comprising a particular client to the particular incident; and
blocking the particular source at the particular VPN internet PoP based on the determination of the match of the particular behavior from the particular source to the particular incident.

32. A network-enabled threat mitigation system comprising:
a first computing system comprising at least a first processor and at least a first non-transitory computer readable storage medium having encoded thereon first instructions that when executed by the at least the first processor cause the first computing system to perform a first process including:
enabling a first virtual private network internet point of presence ("VPN internet PoP");
connecting a plurality of VPN tunnels to an internet via the first VPN internet PoP;
determining a plurality of technical indicators associated with the plurality of VPN tunnels; and
transmitting the plurality of technical indicators associated with the plurality of VPN tunnels;
a second computing system comprising at least a second processor and at least a second non-transitory computer readable storage medium having encoded thereon second instructions that when executed by the at least the second processor cause the second computing system to perform a second process including:
enabling a second virtual private network internet point of presence ("VPN internet PoP"); and
enabling use of the second VPN internet PoP by a plurality of sources comprising a plurality of clients;
a third computing system in network communication with the first computing system and the second computing system, the third computing system comprising at least a third processor and at least a third non-transitory computer readable storage medium having encoded thereon third instructions that when executed by the at least the third processor cause the third computing system to perform a third process including:
accessing a first intelligence feed comprising a plurality of cybersecurity incidents, including at least one of threats or attacks, observed on at least one internet-connected computing system and respective indications of from where the plurality of cybersecurity incidents originated;
receiving from the first computing system the plurality of technical indicators;
generating a second intelligence feed comprising the plurality of technical indicators;
comparing the first intelligence feed to the second intelligence feed;
determining a particular incident of the plurality of cybersecurity incidents based on the comparison of the first intelligence feed to the second intelligence feed;
determining a time frame of the particular incident based on at least one of the first intelligence feed or the second intelligence feed;
monitoring the use of the second VPN internet PoP by the plurality of sources comprising the plurality of clients to determine a plurality of time-based behaviors;
comparing the plurality of time-based behaviors to the particular incident and to the time frame of the particular incident to determine a match of a particular behavior of the plurality of time-based behaviors from a particular source comprising a particular client of the plurality of sources to the particular incident; and
blocking the particular source at the second VPN internet PoP based on the determination of the match of the particular behavior from the particular source to the particular incident.

* * * * *